Figure 12:
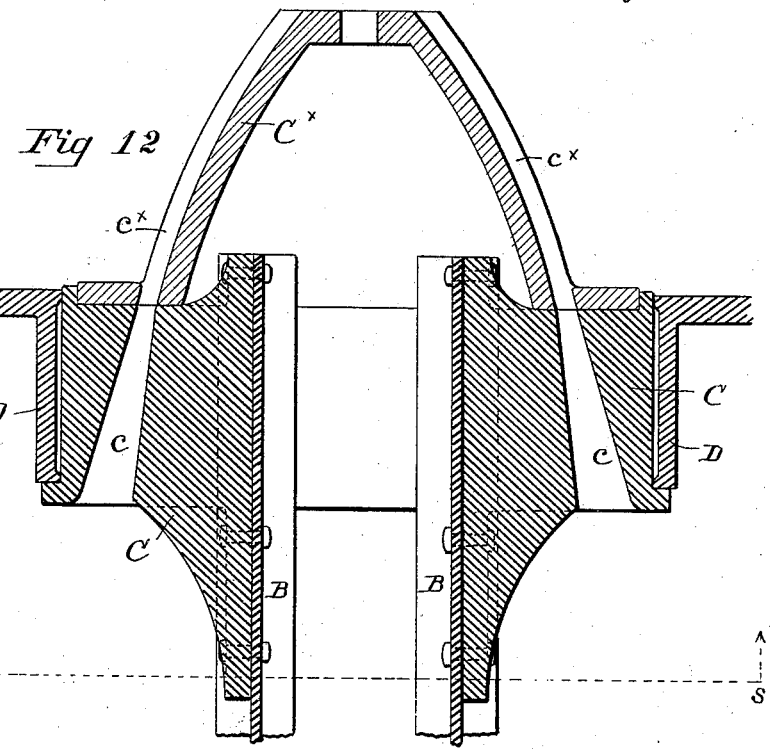

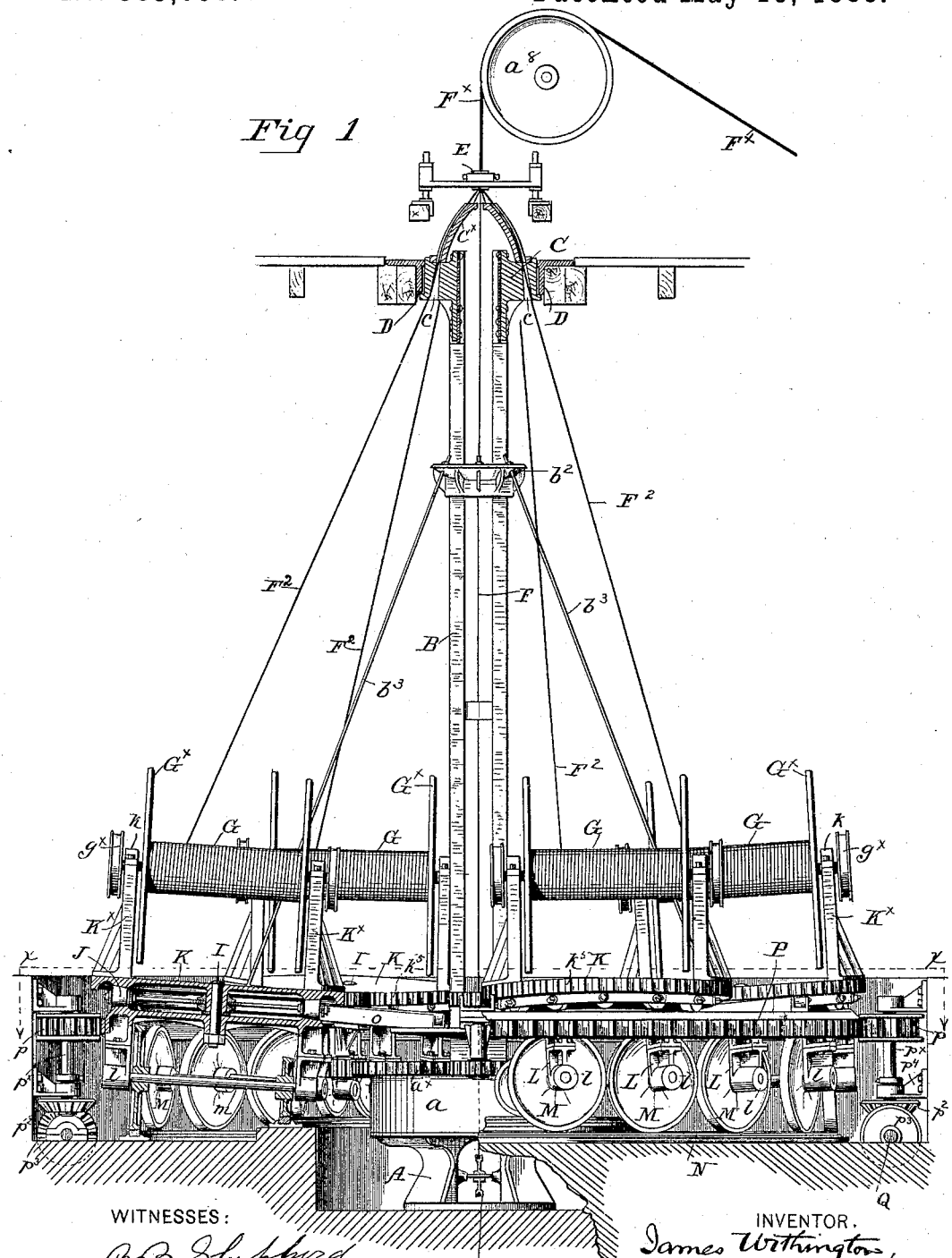

(No Model.) 7 Sheets—Sheet 2.
J. WITHINGTON.
VERTICAL WIRE ROPE CLOSING MACHINE.
No. 383,088. Patented May 15, 1888.
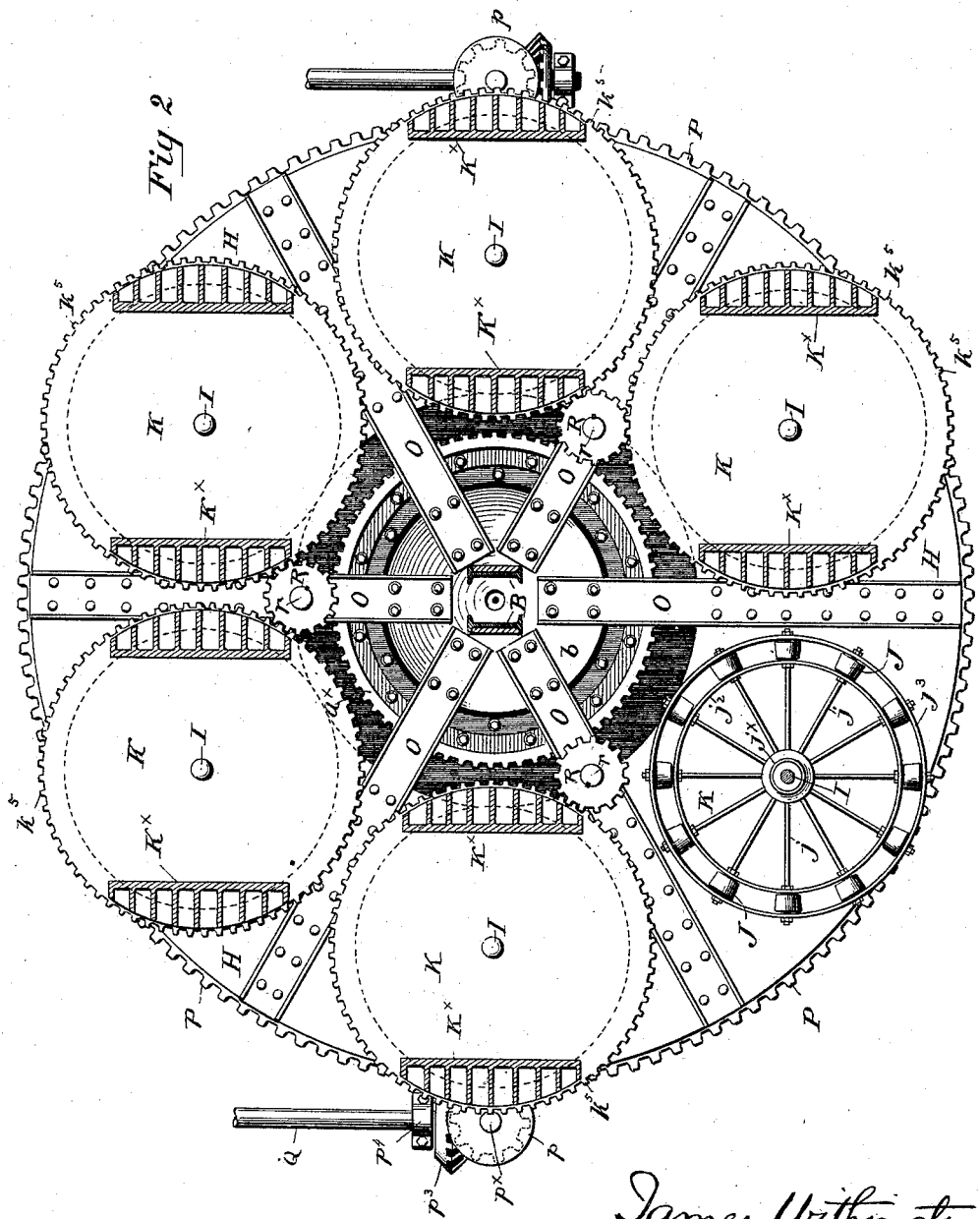

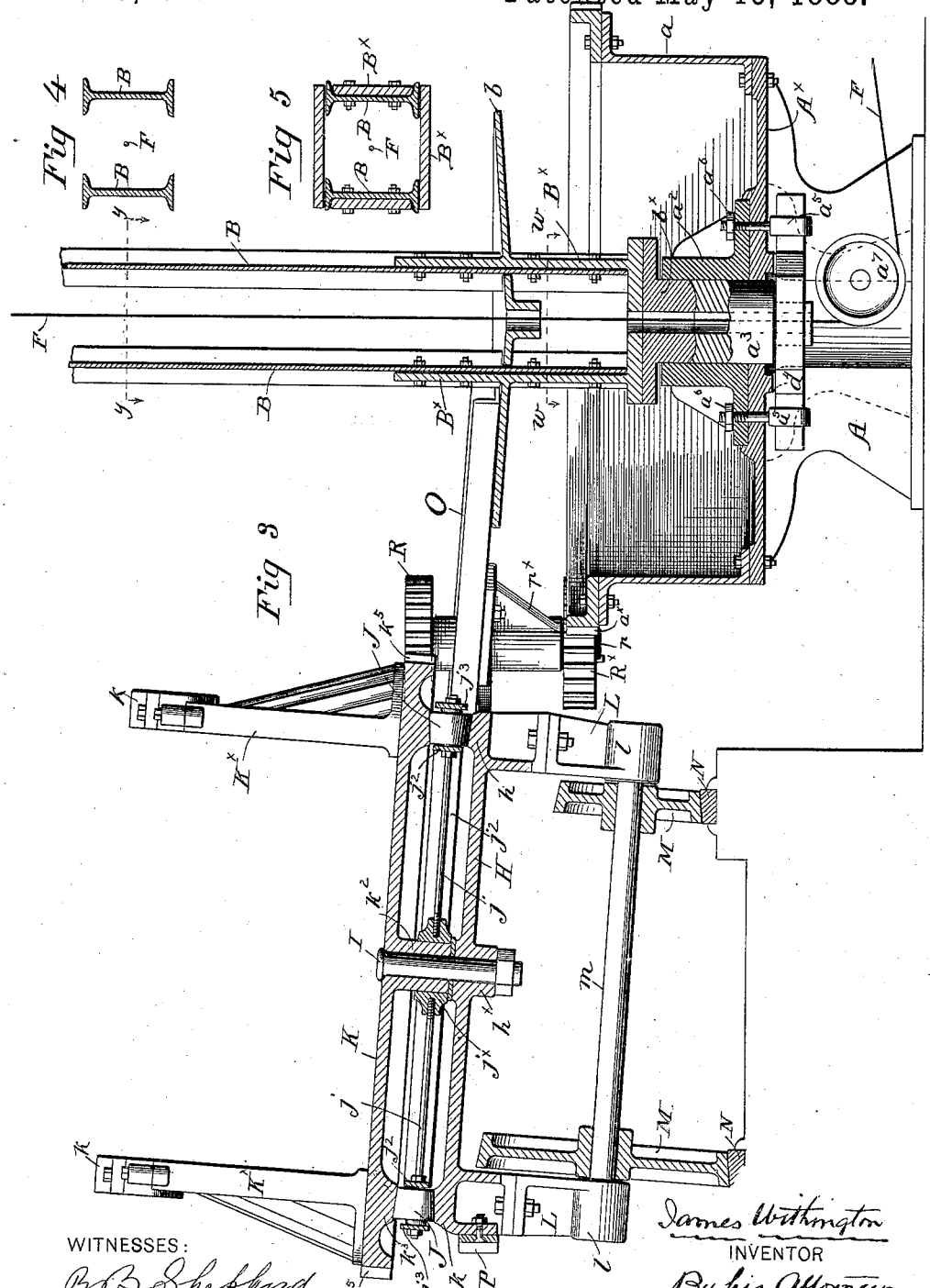

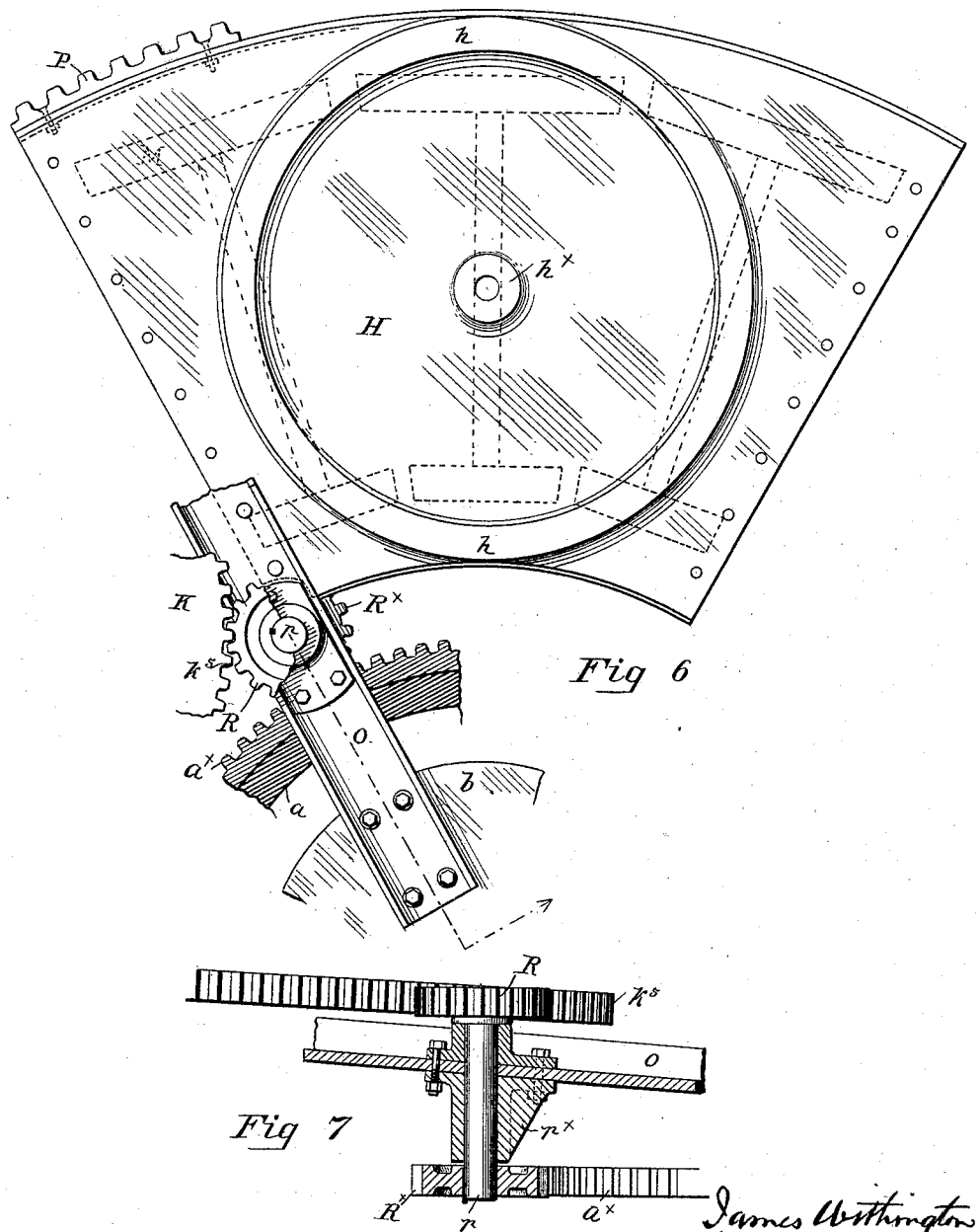

(No Model.) 7 Sheets—Sheet 5.
J. WITHINGTON.
VERTICAL WIRE ROPE CLOSING MACHINE.
No. 383,088. Patented May 15, 1888.
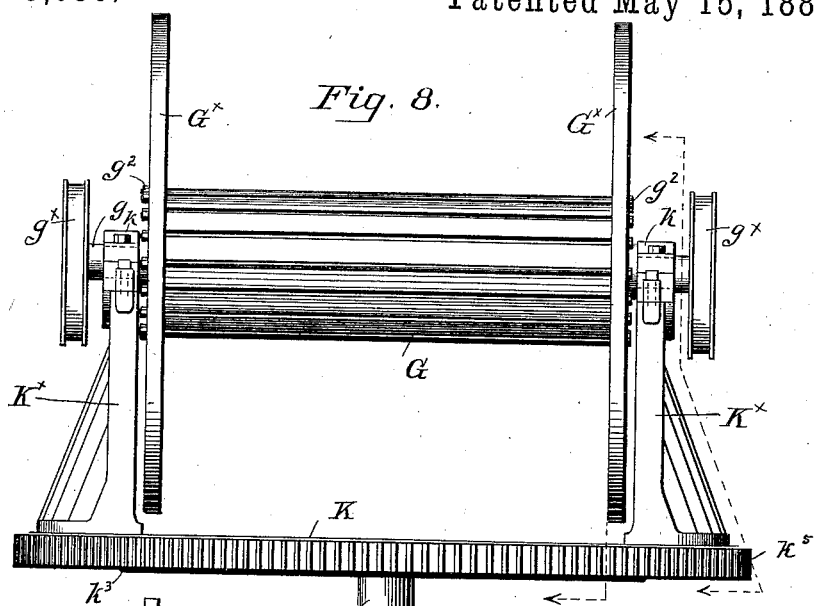
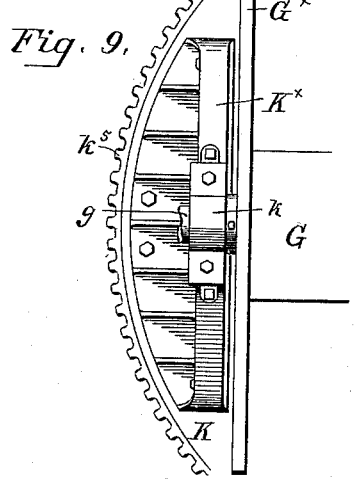
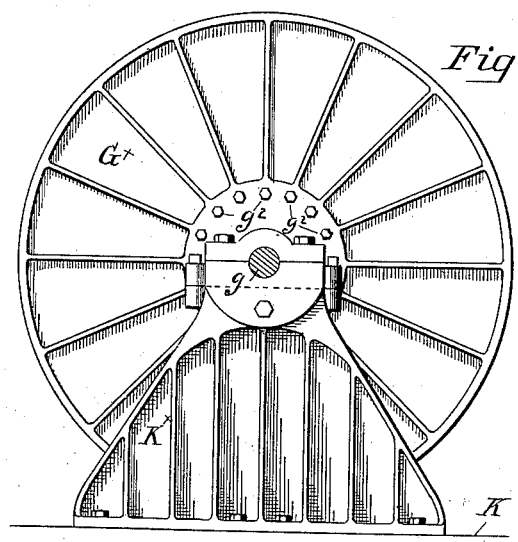
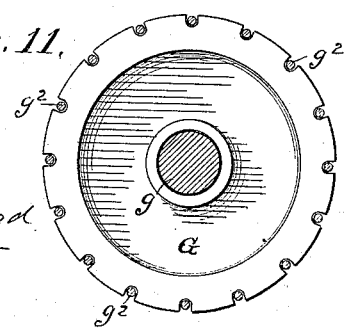
WITNESSES:
INVENTOR (No Model.)  7 Sheets—Sheet 6.

J. WITHINGTON.
VERTICAL WIRE ROPE CLOSING MACHINE.

No. 383,088.  Patented May 15, 1888.

WITNESSES:

INVENTOR,
James Withington
By his Attorneys, (No Model.)  7 Sheets—Sheet 7.

J. WITHINGTON.
VERTICAL WIRE ROPE CLOSING MACHINE.

No. 383,088. Patented May 15, 1888.

UNITED STATES PATENT OFFICE.

JAMES WITHINGTON, OF CHAMBERSBURG, ASSIGNOR TO THE TRENTON IRON COMPANY, OF TRENTON, NEW JERSEY.

VERTICAL WIRE-ROPE-CLOSING MACHINE.

SPECIFICATION forming part of Letters Patent No. 383,088, dated May 15, 1888.

Application filed January 31, 1888. Serial No. 262,491. (No model.)

*To all whom it may concern:*

Be it known that I, JAMES WITHINGTON, a citizen of the United States, residing at Chambersburg, in the county of Mercer, and State of New Jersey, have invented certain new and useful Improvements in Vertical Wire-Rope-Closing Machines, of which the following is a specification.

Closing machines are employed to close or lay about a main core strands made on strand-forming or stranding machines and thus to form wire ropes or cables. They are constructed or equipped with as many strand-carrying bobbins as there are strands in the cable which they are especially intended to make.

My invention relates to a class of machines designed for use in the manufacture of underground traction cables. These cables are ordinarily, but not always, made of nineteen wires of uniform diameter to the strand, and are laid up in the usual manner, that is to say, six about one to form a strand core and twelve about the seven to form a strand. In closing, six of these strands are laid about a hempen core to form the completed rope or cable. Whatever, however, be the specific character of the cable, it is essential that in its laying up all of its component wires should have a uniform twist or lay, or, in other words, should be so laid in the strand that they do not lap or cross. That is important because an irregular lay, occasioning lumps or irregularities in its surface, will be a fruitful source of the rapid wearing-out of the cable. Inasmuch, moreover, as splices are not permitted in the manufacture of traction cables, it is evident that each strand has to be originally made of the ultimate length of the completed cable, and that, therefore, the closing machine must be sufficiently strong and solid to carry the entire weight of the cable at a single charge or load. As, moreover again, this weight often aggregates thirty, forty, or fifty tons, usually distributed upon but six strand-carrying bobbins, and as, during the revolution of the machine as an entirety for the laying and closing of the strands about the main core, each strand core bobbin must not only be revolved about or with respect to a common center being the axis of the machine but be also caused to maintain, or be preserved in, a given directional relationship each with respect to all of the others and also with respect to the points of the compass,—it is apparent that not only must the machine itself be of exceptional solidity and strength but also that it is of the first importance to reduce friction at all points as much as possible. The single rope machines heretofore existing in which the weight of the strand bobbins which carry the completed strands, and the compound rope machines heretofore existing in which the weight of both the strand core bobbins and the strand wire bobbins, are, alike in each instance, supported by spiders, arms or brackets rigidly sprung from and carried and supported wholly by a central shaft itself stepped upon a central step, are not adapted for use as closing machines for the closing of the strands forming traction cables,—it being from an economical stand point impracticable to construct a central step capable of enduring the weight of the entire machine when run at the necessary speed, and impracticable also from a similar standpoint to employ the power required for driving the machine, the very best steps heretofore constructed heating and wearing to an extent necessitating frequent stoppages for cooling down and for repairs. Even, moreover, such compound rope machines as that which constitutes the subject matter of United States Letters Patent No. 358,663, granted March 1, 1887, to William Hewitt, and in which the weight of the strand core bobbins is superimposed upon a basal spider sprung from the shaft but provided with a peripheral rim supported upon friction rollers,—are not suitable for the purpose of cable closing machines, because the enormous weight of the cable strands, if loaded upon the strand core bobbins of machines of the character referred to, would be in effect carried as much upon the central step as upon the friction rolls for supporting the peripheral rim of the spider, and would be sufficient to wear out and overheat both the step and the peripheral rolls.

The object of my invention is the construction of a cable closing machine,—or a machine for at a single continuous operation closing about a main core the entire lengths of continuous strands of great aggregate length and weight,—in which each of the strand-carrying bobbins is supported in entire independence of a central step,—and a machine, moreover, in which friction is reduced to a minimum, the gearing for maintaining directional relationship of the bobbins simplified, and the construction of the entire device both simplified and solidified.

To the foregoing ends my invention comprehends a machine of such organization that each strand-carrying bobbin is in fact and effect carried upon an independent wheeled truck which, while adapted for travel upon a circular track, is yet of such construction as to carry evenly or uniformly distributed upon its wheels the entire weight of its bobbin and take such weight wholly off the central step of the main shaft of the machine.

Machinery embodying a good form of my improvements is represented in the accompanying drawings and described in this specification, the particular subject-matter claimed as novel being hereinafter definitely specified.

Figure 13:
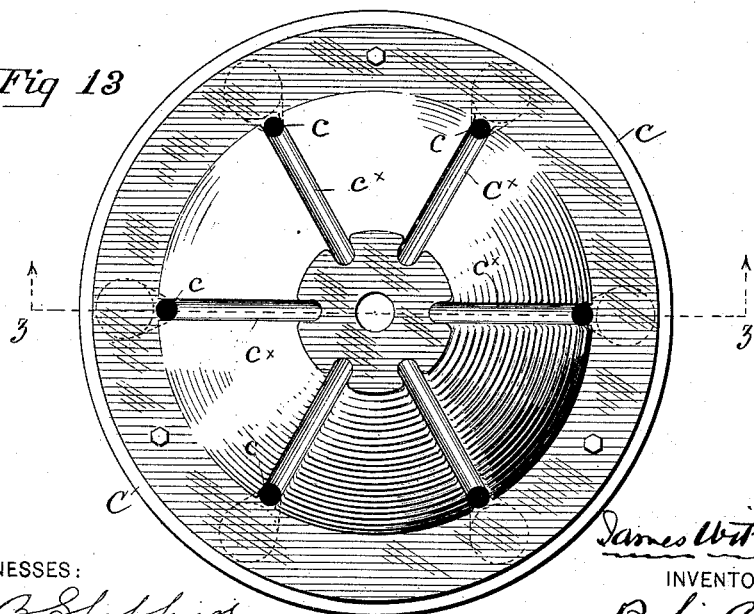
Figure 14:
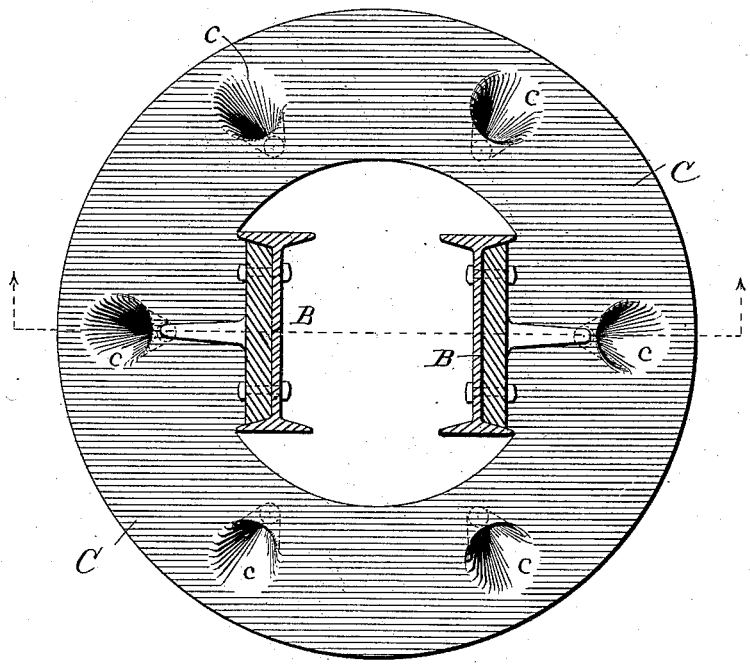

In the accompanying drawings, Figure 1 is an elevational view, partially fragmentary and partially sectional, of a machine embodying my invention. Fig. 2 is a horizontal plan through the machine of Fig. 1 in the plane of the dotted line $x\,x$ upon Fig. 1 and sight being taken in the direction of the arrows upon said line. Fig. 3 is a fragmentary side sectional elevational detail illustrative of the construction of the main step, main shaft, bobbin carrier, and carrier truck. Fig. 4 is a sectional plan through the main shaft in the plane of the dotted line $y\,y$ of Fig. 3. Fig. 5 is a similar view in the plane of the dotted line $w\,w$ of Fig. 3. Fig. 6 is a fragmentary plan of one of the trucks showing, partially in section, the gearing for preserving the directional relationship in the carriers for the strand bobbins. Fig. 7 is a fragmentary sectional elevational detail through one of the pinion shafts employed as a portion of the devices for preserving directional relationship. Fig. 8 is a front elevational view of one of the bobbin carriers and its bobbin. Fig. 9 is a fragmentary top plan view of the same. Fig. 10 is an end elevational view of the same. Fig. 11 is an end elevational view of the body of the strand bobbin, the tie bolts and bobbin shaft or gudgeon being in section. Fig. 12 is a central vertical sectional elevation of the cable-laying head in the plane of the dotted line $z\,z$ of Fig. 13. Fig. 13 is a top plan view of the cable-laying head represented in Fig. 12. Fig. 14 is an under sectional plan in the plane of the dotted line $s\,s$ of Fig. 12 of the cable laying head.

Similar letters of reference indicate corresponding parts.

In the drawings, A is the central base of the machine, a foundation structure or bed of any preferred character. This base supports a flat and preferably circular bed plate $A^\times$, which in turn supports, conveniently by the aid of a circular web $a$, a fixed circular toothed rack $a^\times$. The base and bed plate are both centrally apertured, and the bed plate supports a tubular step-socket $a^2$, within the cylindriform hollow interior of which is introduced an axial apertured main step $a^3$ upon which the main shaft of the machine is stepped. The main step is conveniently superimposed upon a step-carrying yoke $a^4$, supported by suspenders $a^5$, the upturned extremities of which are preferably threaded and armed with nuts $a^6$ which bear upon the upper face of the bed plate, or, more strictly, the base of the step socket, in order to permit of the vertical adjustment of the suspenders and consequently of the step-carrying yoke and the main step itself.

The main shaft itself is conveniently composed of a pair of parallel vertically erected rolled double T-beams or girders B B framed together near their lower extremities by being bolted to a shaft base $B^\times$ of the general character of a rectangular elongated socket, which is provided with a horizontal outwardly extending radial flange $b$, and is as to its base equipped with an axially apertured toe $b^\times$ or lower pivot of the shaft as an entirety. Intermediate of their length the beams B are connected by a tie bar collar $b^2$, from which are sprung tie bars $b^3$ for staying the shaft and rigidifying with respect thereto the radial channel bars hereinafter described.

At their upper extremities the beams B are provided with a cable-laying head, Figs. 1, 12, 13 and 14, composed essentially of a central axially-apertured cylindriform casting C of substantially the form represented in the drawing, having a series of convergently inclined strand passages $c$ corresponding in number with the number of strand-carrying bobbins and radially aligned therewith, upon which is mounted a conical cap $C^\times$ having external grooves $c^\times$ aligned with the strand passages in the casting and in which the strands lie. The entire strand laying head being a fixture and adapted to rotate with the main shaft is boxed in a head boxing D, Figs. 1 and 12, framed in the apartment or building within which the machine as an entirety is erected. Above the conical cap, which is, of course, axially apertured, a closing die E of any preferred character is suitably supported. The main core F of the cable $F^\times$ is led into the machine beneath and around a lower directing roll $a^7$, and then led through the axial apertures of the step, shaft, toe, and strand-laying head, and, with the strands $F^2$ closed or laid about it, through the closing die and about the upper directing roll $a^8$ from which it is led off to be ultimately coiled.

G are the strand-carrying spools or bobbins herein termed the strand bobbins. The machine represented possesses six of these bobbins, but it is understood that a greater or even a less number may be employed. Each of these bobbins has capacity for carrying a strand long enough to unspliced produce the ultimate length of cable. The gudgeons $g$ of the bobbins are prolonged beyond their bearings, and each equipped with a friction pulley $g^x$ of a well known character, by the application of friction straps to which the too rapid unwinding rotation of the bobbins is prevented. All of the bobbins are supported in and carried by bobbin carriers composed each essentially of a circular base or carrier disk K, integral with and from each of which are erected a pair of standards $K^x$ surmounted by the bearing boxes $k$ which house the gudgeons of the bobbins. The form of the standards is inconsequential; that represented is suitable for the purpose. The form of the strand bobbins also is of no moment. I prefer, however, to form each bobbin with a cylindric longitudinally-grooved spool or carrying body designated by the letter G, to the extremities of which are applied a pair of circular heads designated $G^x$. Both heads of each pair are connected with their respective body by means of head bolts $g^2$ which pass through holes formed in said heads and lie within the corrugations or grooves in said body, as shown in Figs. 8, 10 and 11.

Each bobbin carrier is mounted upon what I term a bobbin truck which carries the entire weight of the carrier bobbin and the coiled strand upon the bobbin. The trucks are represented in detail in Fig. 6, and are preferably constructed after the manner represented, that is to say, each is composed of a plate or web which is designated H and which has the form of a segment of a sector as represented in Fig. 6. This plate or web is upon its upper face provided with a circular track $h$ within the center of which is formed a tubular boss or center casting $h^x$ through which passes a king bolt I which also passes through a tubular sleeve $k^2$ formed upon the under face of the bobbin carrier disk at the center thereof. Each bobbin carrier turns about its king bolt as a center, and the disk of each carrier is as to its under face provided with a circular track $k^3$ corresponding to the track $h$ upon the plate or web of the truck in connection with which it operates. Interposed between the respective tracks of the truck web and carrier disk are a series of radially distributed friction rollers J, each of which is of the same size and all of which are slightly conical to suit the respective inclinations or pitches of the respective tracks as clearly represented in Figs. 1 and 3. All of these rollers, a series of twelve of which for each bobbin carrier are illustrated, in the machine under discussion are held in place by radial roller shafts $j$ upon which the rollers are journaled and which pass radially inward to a shaft collar $j^x$ mounted upon the tubular sleeve $k^2$ of the carrier disk, to which collar they are connected. Each roller is also restrained from endwise movement upon its shaft by being confined between a pair of concentric roller rings $j^2 j^3$, Figs. 2 and 3, which afford bearings for the roller shafts and serve to maintain the radial distribution of the rollers and shafts.

By virtue of the foregoing construction it is apparent that each bobbin carrier will be susceptible of rotation with respect to its carrying truck and with a minimum friction. Each truck is provided with three pairs of pedestals L which respectively support axle boxes $l$ for the journals of axles $m$, three of which are preferably provided for each truck and which are each provided with two car wheels M. Each truck being thus mounted upon six wheels is wholly supported thereupon. The wheels travel respectively as to the inner and outer series upon two circular rails N together forming a circular rail road concentric with the main step of the machine and laid upon a circular road bed built about and in concentricity with the central base of the machine. Each of the axles is radially disposed with respect to the axis of the machine, and the outer wheel of each axle is of greater diameter than the inner, as shown in the drawings, the calculation of diameters being such that each wheel of a given pair completes its rotation synchronously with its mate, neither wheel being compelled to make more revolutions than the other. This construction, of course, necessitates wheels the tread of which is slightly conical and tracks preferably having corresponding inclinations. The pitch of each truck and consequently of each bobbin carrier disk is also slightly inward and downward toward the main shaft, a construction which of course tends to prevent the trucks from jumping the track, counteracts the tendency of bodies moving in a circular path to fly off at a tangent, and at the same time allows the strands to be drawn off in a more direct course to the cable-laying head. Each of the trucks is preferably connected to both of its neighbors, and also tied or stayed with respect to the main shaft, by the application of a series of channel bars O radially disposed and overlying the radial intersections of the sectors composing the trucks, to the meeting edges of each adjacent pair of which the same channel bar is at its outer extremity bolted, while at its inner extremity it is conveniently secured to the main shaft by being bolted to the radial circular flange $b$ which is in effect a part of said shaft.

By virtue of the foregoing construction, which is simply one of mechanical convenience conducive to the stability and durability of the device, the trucks are in effect coupled together and caused in their revolution with respect to the main step to travel as an integral truck. The power utilized to occasion the revolution of the trucks is applied to the composite periphery which the outer arcs of the trucks together go to make up, and to this end the connected trucks are provided with a peripheral truck rack P which is engaged by a driving pinion $p$ fixed upon a vertical pinion shaft $p^x$ the lower extremity of which is provided with a bevel pinion $p^2$ gearing with a counter bevel pinion $p^3$ fixed upon a driving shaft Q to which motive power is applied. The pinion shaft is conveniently housed in boxings $p^4$.

In the drawings I have represented duplicate driving pinions, pinion shafts, bevel gears, and driving shafts, the driving pinions engaging with the truck rack at diametrically opposite points. It being essential in the laying of the strands about the main core to avoid torsion in the strands means for preserving in the bobbins a directional relationship throughout their rotation must be employed. I secure this result by applying to the periphery of each bobbin carrier disk a peripheral rack which I term a disk rack $k^5$ and the teeth of which correspond in number and proportions with the teeth of the fixed rack $a^x$ which latter is of the same diameter as the disk racks. Each disk rack is engaged with a driven rack pinion R erected upon the upper extremity of a pinion shaft $r$ boxed in a bearing $r^x$ formed in or applied to a channel bar, the said shaft and driven rack pinion taking their rotation from the engagement of a driving rack pinion $R^x$ fixed upon the lower extremity of the pinion shaft $r$ and in constant engagement with the fixed rack. By a reference to Fig. 2 it will be observed that I employ but one driven rack pinion, pinion shaft, and driving rack pinion, to do duty in connection with two adjacent bobbin carrier disks, but three of such shafts being in all used. It is of course apparent that as the driven rack pinions and driving rack pinions are of the same diameter and equipped with teeth of the same number and proportions, each bobbin carrier will be caused to make a complete rotation about its king bolt as an axis during the period of one complete revolution of the bobbin carrier disk about the main step as an axis of the machine.

The foregoing is only a type of device adapted to preserve directional relationship in the bobbin carriers throughout their revolution with respect to the axis of the machine.

Having now described the construction of a good form of machine embodying my improvements, it will be apparent that the entire weight or load of each strand bobbin is taken off the main step and distributed upon a double bearing constituted by the inner and outer wheels of the respective trucks,—that the necessity of a heavy spider upon the periphery of the friction rolls is avoided, and that the durability of the main step is enhanced. The interposition moreover of the friction rolls between the bobbin carrier disks and the trucks avoids transmitting the weight through the king bolts about which the bobbins turn and consequently prevents any tendency of the king bolts to bind in their bearings by reason of an unbalanced load.

Having thus described my invention, I claim and desire to secure by Letters Patent:—

1. The combination, of a central rotatable vertical main shaft, a main step upon which said shaft is mounted and rotates, a cable-laying head connected and rotatable with the main shaft, a series of rotatable carriers for strand core bobbins circumferentially distributed about the main shaft, and a series of revoluble supports for said carriers connected with the main shaft but supported in entire independence thereof, substantially as and for the purposes set forth.

2. The combination, of a central rotatable vertical main shaft, a main step upon which said shaft is mounted and rotates, a cable-laying head connected and rotatable with the main shaft, a series of rotatable carriers for strand core bobbins, a series of wheeled trucks for supporting said bobbin carriers in independence of the main step, circumferentially disposed with reference to and so connected as to be rotatable with the main shaft, and a circular track concentric with the main step upon which said wheeled trucks travel, substantially as and for the purposes set forth.

3. The combination, of a rotatable vertical main shaft, a main step upon which said shaft rotates, a cable-laying head, a series of circumferentially distributed and connected wheeled trucks also connected to the main shaft and rotatable therewith, a series of rotatable carriers for strand bobbins mounted respectively upon the trucks, and a fixed circular track concentric with the main step upon which the wheeled trucks travel, substantially as set forth.

4. The combination, of a rotatable vertical main shaft, a main step upon which said shaft rotates, a cable laying head, a series of wheeled trucks connected and rotatable with the main shaft, a series of rotatable carriers for strand bobbins mounted respectively upon the trucks, friction rollers interposed between the carriers for the strand bobbins and the trucks, and a fixed circular track concentric with the main step upon which the wheeled trucks travel, substantially as set forth.

5. The combination of a rotatable main shaft, a main step for said shaft, a rotatable cable-laying head, a series of wheeled trucks circumferentially disposed with reference to and connected with the shaft, and all similarly inclined downwardly and inwardly, revoluble carriers for strand core bobbins respectively mounted upon the trucks and possessing corresponding inclinations, and a circular road bed concentric with the main step, substantially as set forth.

6. The combination of a rotatable vertical main shaft, a series of trucks circumferentially distributed about and connected with said shaft, pairs of wheels of respectively different diameters applied to said trucks, and revoluble carriers for strand bobbins mounted upon said trucks, substantially as set forth.

7. In combination, a wheeled truck, a carrier for a strand core bobbin superimposed upon and pivoted with respect to said truck, and a series of radially and circumferentially distributed friction rolls interposed between the carrier and the truck, substantially as and for the purposes set forth.

In testimony that I claim the foregoing as my invention I have hereunto signed my name this 16th day of January, A. D. 1888.

JAS. WITHINGTON.

In presence of—
 WM. HEWITT,
 JOS. H. WRIGHT.